United States Patent
Kitamura et al.

[11] Patent Number: 4,765,905
[45] Date of Patent: Aug. 23, 1988

[54] METHOD FOR RECOVERING ACIDS FROM AN AQUEOUS SOLUTION OF THE ACIDS AND METAL SALTS BY MEANS OF A FLUORINATED ANION EXCHANGE MEMBRANE

[75] Inventors: Sakae Kitamura; Yasuhiro Kurauchi; Toru Seita, all of Shin-nanyo, Japan

[73] Assignee: Toyo Soda Manufacturing Co., Ltd., Shin-nanyo, Japan

[21] Appl. No.: 928,036

[22] Filed: Nov. 7, 1986

[30] Foreign Application Priority Data

Nov. 11, 1985 [JP] Japan .................. 60-250908

[51] Int. Cl.$^4$ .................................. B01D 13/00
[52] U.S. Cl. ....................... 210/638; 210/644; 210/500.23
[58] Field of Search ............ 210/644, 500.23, 638, 210/649, 500.36

[56] References Cited

U.S. PATENT DOCUMENTS 3,272,737  9/1966  Hansen et al. .............. 210/644 X
4,132,682  1/1979  Seita et al. ................ 210/500.27 X

FOREIGN PATENT DOCUMENTS 52-3617  11/1973  Japan .................. 210/644

Primary Examiner—Frank Spear
Attorney, Agent, or Firm—Oblon, Fisher, Spivak, McClelland & Maier

[57] ABSTRACT

A method for recovering acids from an aqueous solution of a mixture of the acids and metal salts by dialysis, characterized in that a fluorinated anion exchange membrane made of a copolymer having repeating units of the formula:

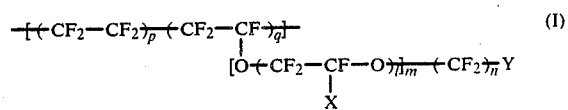

wherein X is F or $CF_3$, l is an integer of from 0 to 5, m is 0 or 1, n is an integer of from 1 to 5, p/q is from 2 to 16, and Y is a quaternary ammonium group, is used as a dialysis membrane.

9 Claims, No Drawings

METHOD FOR RECOVERING ACIDS FROM AN AQUEOUS SOLUTION OF THE ACIDS AND METAL SALTS BY MEANS OF A FLUORINATED ANION EXCHANGE MEMBRANE

The present invention relates to a method for recovering acids for a long period of time from an aqueous solution of a mixture of the acids and metal salts by means of a fluorinated anion exhcange membrane made of a polymer having a perfluorocarbon main chain.

In recent years, various acid treatments have been conducted for surface treatment in various fields such as iron and steel making industry, electronics industry and atomic energy industry. The conditions for such acid treatments vary to a large extent depending upon the types and concentrations of the acids, the temperatures, the dissolved metal concentrations, etc. The metal ion-containing acidic waste solutions discharged from such acid treatments, are enormous in the amounts, and create environmental problems if they are disposed without any treatment. Accordingly, in such various manufacturing industries, it is strongly desired to develop an efficient system for the treatment of waste liquids to secure a water source and to preserve the regional environment, particularly a system for the treatment of waste acids, which is capable of efficiently recovering acids from metal-containing acid treatment waste solutions and reusing the recovered acids.

For instance, in the iron and steel industry, an acid solution of e.g. hydrofluoric acid and nitric acid containing metal ions such as iron, nickel or chromium ions, is discharged in an enormous amount, as an example of the aqueous solution of a mixture of an acid and metal salts. This is because a solution of hydrofluoric acid and nitric acid (i.e. a solution mixture of hydrofluoric acid and nitric acid) is used for the acid treatment to remove scales from steel products, particularly from steel tubes, steel plates or steel wires made of stainless steel. Further, considerable costs are required for the treatment of the sludge by neutralizing the acid solution. A distillation method, a solvent extraction method and an electrodialysis method are known as methods for the recovery of acids from waste liquids. However, in the distillation method, since the acids are highly corrosive, the durable material is limited, and the running costs will be high. The solvent extraction method has problems in the selection of the solvent, the extraction rate and the apparatus. Further, it has a disadvantage that the recovery concentration is low as compared with the distillation method or the electrodialysis method, since it is thereby impossible to decompose the complex of metal ions and fluorine ions. Whereas, the electrodialysis method has a disadvantage that a great deal of electric energy is required for the efficiency of the initial stage of the electrolysis and for the efficiency of recovery. On the other hand, as another method, a diffusion dialysis method is known wherein a waste liquid and water are indirectly brought in contact with each other via an anion exchange membrane so that an acid in the waste liquid is diffused to the water side due to the difference in the concentration of the acid as between the waste liquid and the water. This method has a possibility of being widely used on an industrial scale since the apparatus is not complicated and there is no substantial consumption of energy, and there has been an instance of its practical use.

Heretofore, the diaphragm used for this method has been a hydrocarbon type anion exchange membrane. However, in a case where acids are to be recovered from a waste liquid under severe conditions e.g. in a system where an oxidizing agent is present in the treating solution or in a system where a high temperature is created, the performance of the hydrocarbon type anion exchange membrane is likely to deteriorate in a short period of time, whereby the operation will be practically impossible. Under the circumstances, it has been strongly desired to develop a method for the recovery of acids from waste liquids, whereby the operation can be conducted in a stabilized fashion even under severe conditions and with high efficiency in the recovery of acids.

The present invention has been made for the purpose of satisfying the demand of the industry for utilization of resources and protection of the environment. It is an object of the present invention to provide a convenient and highly efficient recovery method which is free from the drawbacks observed in the conventional distillation method, solvent extraction method, electrodialysis method and diffusion dialysis method, and which can be operated by a small scale apparatus. Another object of the present invention is to provide a method which can be economically and industrially operated even under severe conditions where conventional hydrocarbon membranes are not useful as mentioned above, i.e. in a system where an oxidizing agent is present or in a system where a high tempertature is created.

The present inventors have conducted extensive researches on anion exchange membranes which used to have problems in a method for the recovery of acids by means of such anion exchange membranes, and as a result, have found that a fluorinated anion exchange membrane having a certain specific structure has an extremely excellent characteristic, and further that by using the fluorinated anion exchange membrane having such a specific structure, it is possible to efficiently recover acids from acidic solutions containing various metal ions. The present invention has been accomplished on the basis of these discoveries.

The present invention provides a method for recovering acids from an aqueous solution of a mixture of the acids and metal salts by dialysis, characterized in that a fluorinated anion exchange membrane made of a copolymer having repeating units of the formula:

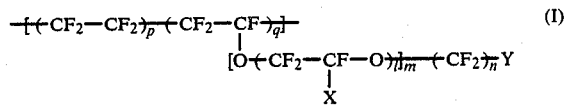  (I)

wherein X is F or $CF_3$, l is an integer of from 0 to 5, m is 0 or 1, n is an integer of from 1 to 5, p/q is from 2 to 16, and Y is a quaternary ammonium group, is used as a dialysis membrane.

Now, the present invention will be described in detail with reference to the preferred embodiments.

The anion exchange membrane to be used for the present invention, can be obtained by subjecting a carboxylate membrane made of a copolymer having repeating units of the formula:

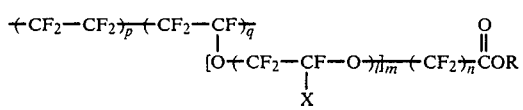

wherein X is F or CF$_3$, l is an integer of from 0 to 5, m is 0 or 1, n is an integer of from 1 to 5, and p/q is from 2 to 16, and R is an alkyl group, to an acid or base treatment, and then introducing anion exchange groups thereinto.

In the present invention, it is preferred to employ a fluorinated anion exchange membrane wherein the quaternary ammonium group has the formula:

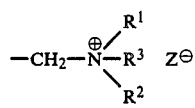

wherein each of R$^1$, R$^2$ and R$^3$ is a lower alkyl group, provided that R$^1$ and R$^2$ may together form a tetramethylene group or a pentamethylene group, and Z$^\ominus$ is a counter ion for the quaternary ammonium ion;

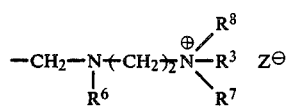

wherein R$^6$ is a hydrogen atom or a lower alkyl group, each of R$^7$ and R$^8$ is a lower alkyl group, or R$^6$ and R$^7$ may together form a polymethylene group of the formula (CH$_2$)$_a$ wherein a is an integer of 2 or 3, R$^3$ is a lower alkyl group, Z$^\ominus$ is a counter ion for the quaternary ammonium ion; or

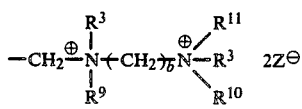

wherein R$^9$ is a hydrogen atom or a lower alkyl group, each of R$^{10}$ and R$^{11}$ is a lower alkyl group, or R$^9$ and R$^{10}$ may together form a polymethylene group of the formula (CH$_2$)$_c$ wherein c is an integer of 2 or 3, b is an integer of from 3 to 7, R$^3$ is a lower alkyl group, and Z$^\ominus$ is a counter ion for the quaternary ammonium ion. The counter ion for the quaternary ammonium ion, is selected preferably from the group consisting of a halogen anion, NO$_3{}^\ominus$, ½(SO$_4{}^{2\ominus}$), BF$_4{}^\ominus$, SbCl$_6{}^\ominus$,

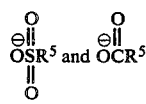

wherein R$^5$ is a lower alkyl group, a substituted or unsubstituted phenyl group or a lower perfluoroalkyl group. Possible substituents for the phenyl group include lower alkyl, halo, halo lower alkyl, amino and mono- or di-(lower alkyl)amino.

The lower alkyl group for R$^1$ to R$^3$ and R$^5$ to R$^{11}$ is preferably a C$_1$–C$_6$ alkyl group, especially a C$_1$–C$_4$ alkyl group.

Specifically, anion exchange membranes having the following structures may be mentioned:

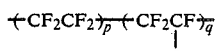
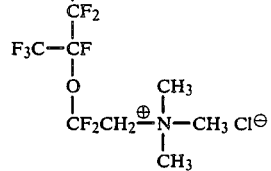

(1)

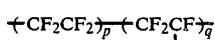
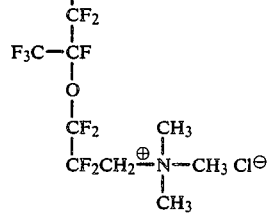

(2)

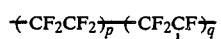
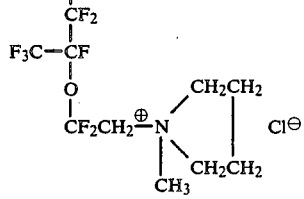

(3)

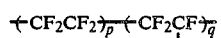
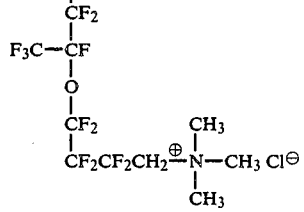

(4)

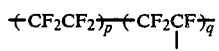
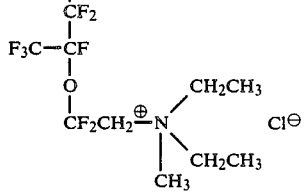

(5)

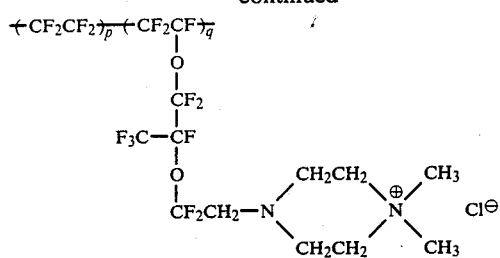

(6)

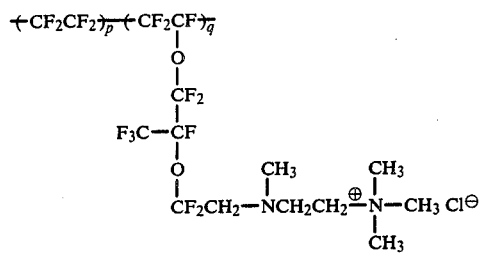

(7)

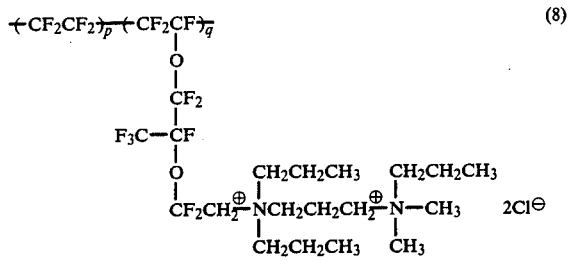

(8)

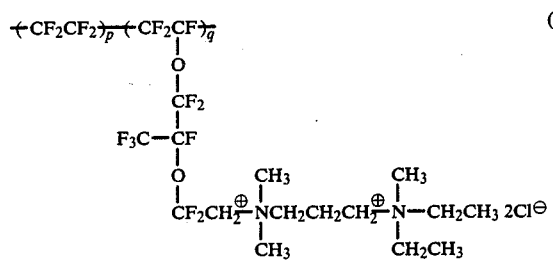

(9)

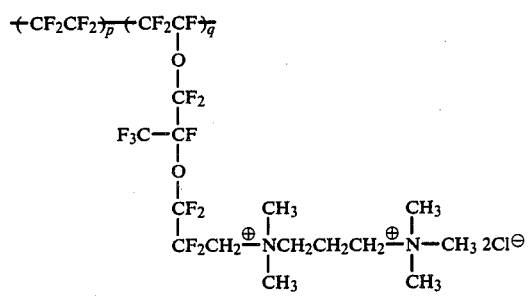

(10)

With respect to the ion exchange capacity of the anion exchange membrane, it is possible to employ a membrane having an ion exchange capacity within a range of from 0.16 to 3.0 meq/g dry resin. However, it is preferred to employ a membrane having an ion exchange capacity within a range of from 0.5 to 2.8 meq/g dry resin.

The p/q value of the membrane is related to the reciprocal of the ion exchange capacity. Namely, the smaller the ion exchange capacity, the larger the p/q value, and the larger the ion exchange capacity, the smaller the p/q value.

The thickness of the anion exchange membrane to be used, is usually within a range of from 40 to 500 $\mu$m, preferably within a range of from 100 to 300 $\mu$m. If the thickness of the membrane is less than 40 $\mu$m, the strength of the membrane tends to be inadequate. On the other hand, if the thickness exceeds 500 $\mu$m, the efficiency for the recovery of acids tends to deteriorate.

In order to increase the strength of the membrane, a reinforcing material having a Teflon ® network structure or a reinforcing material such as Teflon ® fibril fibers or glass wool, may be incorporated.

By using the anion exchange membrane as described above, it is possible to efficiently recover acids even under severe conditions where practical operation with the conventional anion exchange membranes is believed impossible, such as in a system where an oxidizing agent is present, or in a system where a high temperature is created.

The fluorinated anion exchange membrane used for the recovery method of the present invention, may be employed in a flat membrane state i.e. in a state where the waste liquid and the water for diffusion are partitioned by the flat ion exchange membrane. In such a case, the waste liquid and the diffusing water, may be supplied to flow in the same direction, or may preferably be supplied countercurrently to each other.

The same flat membrane may be employed in a spiral form, i.e. a spacer partitioning the waste liquid side and the water side and the ion exchange membrane, are wound into a spiral form, so that one side constitutes the waste liquid side and the other side constitutes the water side for the recovery. Also in this form, it is preferred to supply both liquids countercurrently.

The fluorinated anion exchange membrane used for the recovery method of the present invention, may be employed in the form of a hollow filament i.e. a filament having an internal hollow structure. In this case, it is possible to obtain a large surface area of the membrane per volume, whereby the membrane can be used with high efficiency.

With respect to the conditions for the operation of the fluorinated anion exchange membrane in the recovery method of the present invention, the liquid temperature is usually from 0° to 80° C., preferably from 20° to 60° C., and the flow rate is usually from 0.01 to 10 liter/hour.m$^2$, preferably from 0.5 to 2.0 liter/hour.m$^2$. If the flow rate is less than 0.01 liter/hour.m$^2$ or more than 10 liter/hour.m$^2$, it tends to be difficult to efficiently recover acids. The acids to be recovered include mineral acids such as hydrofluoric acid, nitric acid, sulfuric acid and mixtures thereof. The fluorinated anion exchange membrane may be used at an acid concentration of up to 10 mol/liter, preferably from 0.01 to 2 mol/liter, for the process of the present invention.

As mentioned above, by using the fluorinated anion exchange membrane having such a specific structure, it is possible to efficiently recover acids from various solutions of mixtures of acids and metal salts.

The method of the present invention may be employed in various fields. It is especially useful for industrial application in the field of waste liquid treatment.

Now, the present invention will be described in further detail with reference to Examples. However, it should be understood that the present invention is by no means restricted to such specific Examples.

EXAMPLE 1

Diffusion dialysis of the aqueous solution as identified in Table 1, was conducted by a filter presstype diffusion dialysis device with an effective membrane surface area of 2 dm$^2$ by using a fluorinated anion exchange membrane (ion exchange capacity: 1.4 meq/g dry resin, thickness: 130 μm, p/q: 2.8) having the formula:

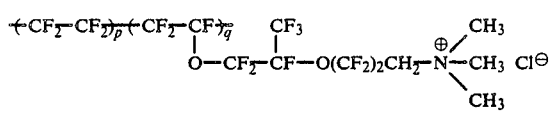

The liquid temperature was 25° C., and the aqueous solution adn water for the recovery of acids were permitted to flow countercurrently each at a flow rate of 0.9 liter/hour.m$^2$. The operation was continued for one year. During the period, the recovery rate of acids, the leak rate and the dialytic diffusion coefficient U were measured. The results are shown in Tables 2 and 3.

TABLE 1

| Composition of the aqueous solution | HNO$_3$ | HF | Fe | Ni | Cr |
|---|---|---|---|---|---|
| Concentration (g/liter) | 60 | 13 | 50 | 5 | 5 |

TABLE 2

| After the initiation of operation | 1 month | 6 months | 1 year |
|---|---|---|---|
| Acid recovery rate (%) | | | |
| HNO$_3$ | 90 | 92 | 94 |
| HF | 85 | 86 | 87 |
| Leak rate (%) | | | |
| Fe | 1.0 | 1.0 | 1.1 |
| Ni | 0.9 | 1.0 | 1.0 |
| Cr | 1.0 | 1.0 | 1.1 |

TABLE 3

| After the initiation of operation | U-acid (mol/hr · m$^2$ · (mol/liter)) | U-salt (mol/hr · m$^2$ · (mol/liter)) | U-salt/U-acid |
|---|---|---|---|
| 1 month | 12.7 | 3.9 × 10$^{-1}$ | 3.1 × 10$^{-2}$ |
| 6 months | 12.8 | 3.9 × 10$^{-1}$ | 3.0 × 10$^{-2}$ |
| 1 year | 12.7 | 3.9 × 10$^{-1}$ | 3.1 × 10$^{-2}$ |

The dialytic diffusion coefficient U (mol/hr.m$^2$.(mol/liter)) shown in Table 3, was obtained by the following equation.

$$U = \frac{M}{C \times A}$$

where
M: Amount of transfer per unit time (mol/hr)
C: Difference in the concentration between the two solutions (mol/liter)
A: Effective surface area of the membrane (m$^2$)

Here, a membrane having a large U-acid value and a small U-salt value can be regarded as having excellent properties.

From the above results, the anion exchange membrane of the present invention was found to undergo no substantial change in the membrane properties during the continuous operation for one year.

COMPARATIVE EXAMPLE 1

By using a commercially available membrane for diffusion dialysis (a hydrocarbon type anion exchange membrane), the diffusion dialysis operation was conducted under the same conditions as in Example 1. The results are shown in Tables 4 and 5.

TABLE 4

| After the initiation of operation | 1 month | 6 months | 1 year |
|---|---|---|---|
| Acid recovery rate (%) | | | |
| HNO$_3$ | 80 | * | * |
| HF | 72 | * | * |
| Leak rate (%) | | | |
| Fe | 4.0 | * | * |
| Ni | 3.8 | * | * |
| Cr | 4.2 | * | * |

*Not measurable due to the rupture of the membrane

TABLE 5

| After the initiation of operation | U-acid (mol/hr · m$^2$ · (mol/liter)) | U-salt (mol/hr · m$^2$ · (mol/liter)) | U-salt/U-acid |
|---|---|---|---|
| 1 month | 8.6 | 4.7 × 10$^{-1}$ | 5.5 × 10$^{-2}$ |

From the comparison of the results of Example 1 and Comparative Example 1, it is evident that the recovery of acids can be conducted by the membrane of the present invention more efficiently than by the commercially available membrane for diffusion dialysis.

EXAMPLE 2

The diffusion dialysis operation was conducted under the same conditions as in Example 1 by using a fluorinated anion exchange membrane (ion exchange capacity: 1.8 meq/g dry resin, thickness: 170 μm, p/q: 8.3) having the formula:

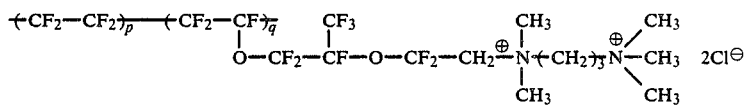

The results are shown in Tables 6 and 7.

TABLE 6

| After the initiation of operation | 1 month | 6 months | 1 year |
|---|---|---|---|
| Acid recovery rate (%) | | | |
| HNO$_3$ | 92 | 95 | 93 |
| HF | 86 | 88 | 86 |
| Leak rate (%) | | | |
| Fe | 1.2 | 1.2 | 1.1 |
| Ni | 1.1 | 1.2 | 1.1 |
| Cr | 1.1 | 1.2 | 1.2 |

TABLE 7

| After the initiation of operation | U-acid (mol/hr · m² · (mol/liter)) | U-salt (mol/hr · m² · (mol/liter)) | U-salt/U-acid |
|---|---|---|---|
| 1 month | 12.0 | $3.6 \times 10^{-1}$ | $3.0 \times 10^{-2}$ |
| 6 months | 12.1 | $3.7 \times 10^{-1}$ | $3.1 \times 10^{-2}$ |
| 1 year | 12.0 | $3.6 \times 10^{-1}$ | $3.0 \times 10^{-2}$ |

No substantial change was observed in the membrane properties during the continuous operation for one years.

EXAMPLE 3

The diffusion dialysis operation was conducted under the same condition as in Example 1 except that a fluorinated anion exchange membrane (ion exchange capacity: 1.2 meq/g dry resin, thickness: 130 μm, p/q: 3.1) having the structure:

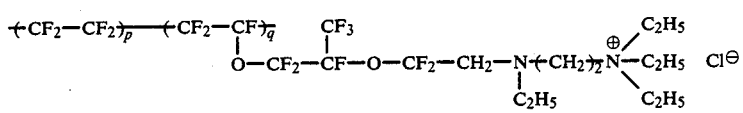

was used, and the liquid temperature was changed to 60° C. The results are shown in Tables 8 and 9.

TABLE 8

| After the initiation of operation | 1 month | 6 months | 1 year |
|---|---|---|---|
| Acid recovery rate (%) | | | |
| HNO₃ | 93 | 93 | 94 |
| HF | 87 | 86 | 87 |
| Leak rate (%) | | | |
| Fe | 1.2 | 1.2 | 1.3 |
| Ni | 1.2 | 1.1 | 1.2 |
| Cr | 1.2 | 1.2 | 1.2 |

TABLE 9

| After the initiation of operation | U-acid (mol/hr · m² · (mol/liter)) | U-salt (mol/hr · m² · (mol/liter)) | U-salt/U-acid |
|---|---|---|---|
| 1 month | 15.0 | $4.7 \times 10^{-1}$ | $3.1 \times 10^{-2}$ |
| 6 months | 14.9 | $4.7 \times 10^{-1}$ | $3.2 \times 10^{-2}$ |
| 1 year | 14.9 | $4.6 \times 10^{-1}$ | $3.1 \times 10^{-2}$ |

COMPARATIVE EXAMPLE 2

By using a commercially available anion exchange membrane, the diffusion dialysis operation was conducted under the same conditions as in Example 3. The membrane ruptured within 24 hours from the initiation of the operation.

EXAMPLE 4

The diffusion dialysis was conducted under the same conditions as in Example 1 by using a hollow filament module (ion exchange capacity: 1.4 meq/g dry resin, inner diameter: 400 μm, outer diameter: 600 μm) having the same structure as in Example 1 and an effective membrane surface area of 2 dm². The operation was continued for one year. During the period, the recovery rate of acids, the leak rate and the dialytic diffusion coefficient were measured. The results are shown in Tables 10 and 11.

TABLE 10

| After the initiation of operation | 1 month | 6 months | 1 year |
|---|---|---|---|
| Acid recovery rate (%) | | | |
| HNO₃ | 92 | 93 | 94 |
| HF | 86 | 87 | 87 |
| Leak rate (%) | | | |
| Fe | 0.9 | 0.8 | 0.9 |
| Ni | 0.9 | 0.9 | 0.9 |
| Cr | 0.9 | 0.8 | 0.9 |

TABLE 11

| After the initiation of operation | U-acid (mol/hr · m² · (mol/liter)) | U-salt (mol/hr · m² · (mol/liter)) | U-salt/U-acid |
|---|---|---|---|
| 1 month | 14.8 | $4.6 \times 10^{-1}$ | $3.1 \times 10^{-2}$ |
| 6 months | 14.9 | $4.5 \times 10^{-1}$ | $3.0 \times 10^{-2}$ |
| 1 year | 14.8 | $4.4 \times 10^{-1}$ | $3.0 \times 10^{-2}$ |

We claim:

1. A method for recovering acids from an aqueous solution of a mixture of the acids and metal salts by dialysis, characterized in that a fluorinated anion exchange membrane made of a copolymer having repeating units of the formula:

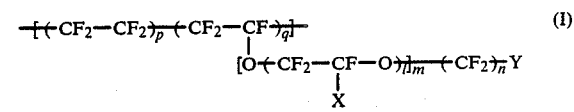

wherein X is F or CF₃, l is an integer of from 0 to 5, m is 0 or 1, n is an integer of from 1 to 5, p/q is from 2 to 16, and Y is a quaternary ammonium group, is used as a dialysis membrane.

2. The method according to claim 1, wherein the quaternary ammonium group has the formula:

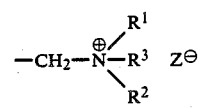

wherein each of R¹, R² and R³ is a lower alkyl group, provided that R¹ and R² may together form a tetramethylene group or a pentamethylene group, and Z⊖ is a counter ion for the quaternary ammonium ion.

3. The method according to claim 2, wherein the counter ion is selected from the group consisting of a halogen anion, NO₃⊖, ½(SO₄²⊖), BF₄⊖, SbCl₆⊖,

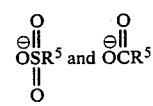

wherein R⁵ is a lower alkyl group, a substituted or unsubstituted phenyl group or a lower perfluoroalkyl group.

4. The method according to claim 1, wherein the quaternary ammonium group has the formula:

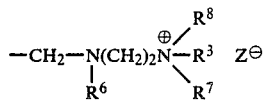

wherein $R^6$ is a hydrogen atom or a lower alkyl group, each of $R^7$ and $R^8$ is a lower alkyl group, or $R^6$ and $R^7$ may together form a polymethylene group of the formula $(CH_2)_a$ wherein a is an integer of 2 or 3, $R^3$ is a lower alkyl group, $Z^\ominus$ is a counter ion for the quaternary ammonium ion.

5. The method according to claim 4, wherein the counter ion is selected from the group consisting of a halogen anion, $NO_3^\ominus$, $\frac{1}{2}(SO_4^{2\ominus})$, $BF_4^\ominus$, $SbCl_6^\ominus$,

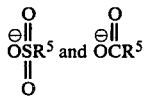

wherein $R^5$ is a lower alkyl group, a substituted or unsubstituted phenyl group or a lower perfluoroalkyl group.

6. The method according to claim 1, wherein the quaternary ammonium group has the formula:

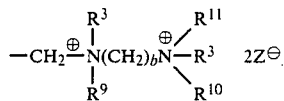

wherein $R^9$ is a hydrogen atom or a lower alkyl group, each of $R^{10}$ and $R^{11}$ is a lower alkyl group, or $R^9$ and $R^{10}$ may together form a polymethylene group of the formula $(CH_2)_c$ wherein c is an integer of 2 or 3, b is an integer of from 3 to 7, $R^3$ is a lower alkyl group, and $Z^\ominus$ is a counter ion for the quaternary ammonium ion.

7. The method according to claim 6, wherein the counter ion is selected from the group consisting of a halogen anion, $NO_3^\ominus\frac{1}{2}(SO_4^{2\ominus})$, $BF_4^\ominus$, $SbCl_6^\ominus$,

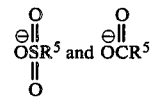

wherein $R^5$ is a lower alkyl group, a substituted or unsubstituted phenyl group or a lower perfluoroalkyl group.

8. The method according to claim 1, wherein the fluorinated anion exchange membrane is in the form of a flat sheet.

9. The method according to claim 1, wherein the fluorinated anion exchange membrane is in the form of a hollow filament.

* * * * *